(12) United States Patent
An

(10) Patent No.: US 12,434,736 B2
(45) Date of Patent: Oct. 7, 2025

(54) HIGH DEFINITION MAP ABNORMALITY INFERENCE AND CORRESPONDING DRIVING METHOD, DEVICE AND MOBILITY APPARATUS

(71) Applicant: ELECTRONICS AND TELECOMMUNICATIONS RESEARCH INSTITUTE, Daejeon (KR)

(72) Inventor: Kyoung Hwan An, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 229 days.

(21) Appl. No.: 17/984,470

(22) Filed: Nov. 10, 2022

(65) Prior Publication Data
US 2023/0174102 A1    Jun. 8, 2023

(30) Foreign Application Priority Data

Dec. 7, 2021  (KR) .................. 10-2021-0173573
Oct. 18, 2022 (KR) .................. 10-2022-0134230

(51) Int. Cl.
  *B60W 60/00*  (2020.01)
  *G01C 21/34*  (2006.01)
(52) U.S. Cl.
  CPC ..... *B60W 60/0011* (2020.02); *G01C 21/3415* (2013.01)
(58) Field of Classification Search
  CPC ....... B60W 60/0011; B60W 2420/403; B60W 2420/408; B60W 30/182; B60W 2552/53;
  (Continued)

(56) References Cited

U.S. PATENT DOCUMENTS 9,612,123 B1 *    4/2017  Levinson .............. B60Q 1/508
2010/0070160 A1 * 3/2010  Haatainen ........... G01C 21/3859
                                                    701/533
(Continued)

FOREIGN PATENT DOCUMENTS

KR        10-1886518       8/2018
KR      10-2019-0002950    1/2019
(Continued)

*Primary Examiner* — Abdalla A Khaled
(74) *Attorney, Agent, or Firm* — KILE PARK REED & HOUTTEMAN PLLC

(57) ABSTRACT

Disclosed herein high definition map abnormality inference and corresponding driving method, device and mobility apparatus. The method includes: determining an abnormality of a high definition map applied to a mobility apparatus based on at least one of road information or surrounding object information recognized in driving of the mobility apparatus; determining whether exceptional object information recognized on a road is present; determining a road condition to be a temporary change situation and determining a first driving control process of the mobility apparatus corresponding to the temporary change situation, when the abnormality of the high definition map and exceptional object information are present; and determining the road condition to be a permanent change situation and determining a second driving control process corresponding to the permanent change situation, when the abnormality of the high definition map is present and the exceptional object information is not present.

13 Claims, 8 Drawing Sheets

(58) Field of Classification Search
CPC ......... B60W 2556/40; B60W 2556/45; B60W 2556/50; B60W 60/001; G01C 21/3415; G01C 21/3822; G01C 21/3837; G01C 21/3848
See application file for complete search history.

(56) References Cited

U.S. PATENT DOCUMENTS

| | | | |
|---|---|---|---|
| 2010/0207787 A1* | 8/2010 | Catten | G08G 1/096716 340/905 |
| 2017/0219353 A1* | 8/2017 | Alesiani | G05D 1/0212 |
| 2018/0045832 A1* | 2/2018 | Ibrahim | G01C 21/1654 |
| 2018/0345962 A1* | 12/2018 | Konishi | B60W 10/04 |
| 2019/0011924 A1* | 1/2019 | Xiao | B60W 30/16 |
| 2019/0019409 A1* | 1/2019 | Farr | G05D 1/0287 |
| 2019/0137287 A1* | 5/2019 | Pazhayampallil | G05D 1/0291 |
| 2019/0137289 A1* | 5/2019 | Annamalai | G01C 21/3415 |
| 2019/0310653 A1* | 10/2019 | Lee | G05D 1/0246 |
| 2020/0174492 A1* | 6/2020 | Lee | G05D 1/0278 |
| 2020/0182631 A1* | 6/2020 | Yang | G06F 16/2379 |
| 2020/0208994 A1* | 7/2020 | Askeland | G01C 21/3841 |
| 2020/0309538 A1* | 10/2020 | Gonsa | G08G 1/0141 |
| 2020/0320875 A1* | 10/2020 | Lacaze | G05D 1/0246 |
| 2020/0363215 A1* | 11/2020 | Rusignola | G01S 17/89 |
| 2020/0393261 A1* | 12/2020 | Zhang | G01C 21/3492 |
| 2020/0401135 A1* | 12/2020 | Chen | G05D 1/0038 |
| 2020/0409352 A1* | 12/2020 | Caldwell | G05D 1/0214 |
| 2021/0004363 A1* | 1/2021 | Bailly | G06T 17/05 |
| 2021/0065540 A1* | 3/2021 | Galden | G01C 21/3415 |
| 2021/0233390 A1* | 7/2021 | Georgiou | G08G 1/0133 |
| 2022/0111866 A1* | 4/2022 | Carroll | B60W 60/0016 |
| 2022/0307842 A1* | 9/2022 | Seta | G01C 21/32 |
| 2022/0355818 A1* | 11/2022 | Janssen | G06V 20/58 |
| 2023/0041975 A1* | 2/2023 | Caldwell | B60W 60/0027 |
| 2023/0065727 A1* | 3/2023 | Yang | H04W 4/46 |
| 2023/0256992 A1* | 8/2023 | Terazawa | G16Y 40/20 701/23 |
| 2024/0046513 A1* | 2/2024 | Grard | G06T 7/74 |
| 2024/0116532 A1* | 4/2024 | Oh | G06V 20/58 |
| 2024/0217556 A1* | 7/2024 | Ploog | B60W 60/0011 |

FOREIGN PATENT DOCUMENTS

| | | |
|---|---|---|
| KR | 10-2103941 | 4/2020 |
| KR | 10-2021-0153696 | 12/2021 |

* cited by examiner

```
for map_point in map_centerline :
    distance_pt = get_distance(map_point, perception_line)
    distance_sum = distance_sum + distance_pt if (distance_sum > threshold_distance_sum) :
    decision = abnormal
else
    decision = normal
```

FIG. 7

```
offroad_objects = get_object_in_offroad(all_perception_objects)
for object in offroad_objects :
    velocity = get_velocity(object)
    if (velocity > threshold_velocity) :
        decision = abnormal
    else
        decision = normal onroad_objects = get_object_in_onroad(all_perception_objects)
for object in onroad_objects :
    object_heading = get_heading(object)
    map_heading = get_map_heading(object)
    if (abs(object_heading - map_heading) > threshold_heading) :
        decision = abnormal
    else
        decision = normal
```

HIGH DEFINITION MAP ABNORMALITY INFERENCE AND CORRESPONDING DRIVING METHOD, DEVICE AND MOBILITY APPARATUS

CROSS REFERENCE TO RELATED APPLICATION

The present application claims priority to Korean Patent Application No. 10-2021-0173573 and filed Dec. 7, 2021 and No. 10-2022-0134230 filed Oct. 18, 2022, the entire contents of which is incorporated herein for all purposes by this reference.

BACKGROUND OF THE INVENTION

1. Field of the Invention

The present disclosure relates to a high definition map abnormality inference and corresponding driving method, device and mobility apparatus, and more particularly, to a high definition map abnormality inference and corresponding driving method, device and mobility apparatus, which infer an abnormality of a high definition map when the high definition map installed in the mobility apparatus capable of autonomous driving is different from an actual road or has errors and determine control processing of the mobility apparatus according to a result of inference.

2. Description of the Related Art

A conventional autonomous driving system searches a route using a pre-loaded precision map or fuses recognized information to determine a driving situation and a maneuver, and then performs autonomous driving. However, the high definition map has a limitation in always reflecting the latest road conditions. The high definition map has errors from the beginning, or road driving areas and lanes may be changed temporarily or permanently due to road construction, etc. Accordingly, there is a problem in that it is impossible to perform driving while always trusting the high definition map. If autonomous driving is performed based on a high definition map different from the actual road, the autonomous driving vehicle may be driven in a non-road area. Also, due to an erroneous determination of a lane in which an obstacle is located, a maneuver and a route are erroneously determined and thus a situation in which the autonomous driving vehicle collides with the obstacle may occur.

Specifically, the conventional autonomous driving system searches a global route based on a pre-loaded high-definition map, and fuses a recognized obstacle with the high definition map to identify a lane in which the obstacle is present. In the conventional autonomous driving system, the maneuver of the autonomous driving vehicle is determined, and an actuator is controlled through a local route plan to drive the vehicle. However, if the high definition map and the actual road have different road structures temporarily or permanently due to construction, etc. or if the high definition map is constructed incorrectly from the beginning and has errors and autonomous driving based on the high definition map is performed, dangerous situations such as going off the road or colliding with surrounding obstacles may occur.

SUMMARY OF THE INVENTION

An object of the present disclosure is to provide a high definition map abnormality inference and corresponding driving method, device and mobility apparatus, which infer an abnormality of a high definition map when the high definition map installed in the mobility apparatus capable of autonomous driving is different from an actual road or has errors and determine control processing of the mobility apparatus according to a result of inference.

The technical problems to be achieved in the present disclosure are not limited to the technical problems mentioned above, and other technical problems not mentioned herein will be clearly understood by those of ordinary skill in the art to which the present disclosure belongs from the following description.

According to another embodiment of the present disclosure, there is provided a high definition map abnormality inference and corresponding driving method, the method comprising: determining an abnormality of a high definition map applied to a mobility apparatus based on at least one of road information or surrounding object information recognized in driving of the mobility apparatus; determining whether exceptional object information recognized on a road is present; determining a road condition to be a temporary change situation which is not accompanied by replacement of the high definition map and determining a first driving control process of the mobility apparatus corresponding to the temporary change situation, when the abnormality of the high definition map and exceptional object information are present; and determining the road condition to be a permanent change situation and determining a second driving control process of the mobility apparatus corresponding to the permanent change situation, when the abnormality of the high definition map is present and the exceptional object information is not present.

According to the embodiment of the present disclosure in the method, when the abnormality of the high definition map is determined by a plurality of pieces of information among information belonging to the road information and the surrounding object information, the abnormality of the high definition map may be determined through a voting process using individual abnormality detection data inferred based on each of the plurality of pieces of information.

According to the embodiment of the present disclosure in the method, the road information may comprise at least one of a road recognition area recognized in driving of the mobility apparatus or road marking information.

According to the embodiment of the present disclosure in the method, the surrounding object information may comprise state information of an object around the driving mobility apparatus.

According to the embodiment of the present disclosure in the method, the exceptional object information may comprise information related to an object for temporarily changing the road condition due to an accidental situation on the road.

According to the embodiment of the present disclosure in the method, the method may further comprise determining the road condition based on external information when the external information having higher priority than the road information, the surrounding object information and the exceptional object information is received. The external information may comprise at least one of traffic situation information or a high definition map which is received from a surrounding mobility apparatus and is more recent than the high definition map.

According to the embodiment of the present disclosure in the method, when autonomous driving of the mobility apparatus is maintained, the determining the first driving control process comprises: checking driving situation information of the mobility apparatus based on the exceptional object information in the road condition; determining whether an unstructured local route and operation control of the mobility apparatus are settable based on the driving situation information; and determining the unstructured local route and operation control and performing control in response to being settable such that the mobility apparatus is autonomously driven.

According to the embodiment of the present disclosure in the method, the method may further comprise controlling the mobility apparatus to a minimum risk level to stop at a slow velocity in response to not being settable.

According to the embodiment of the present disclosure in the method, the second driving control process may comprise tagging the abnormality of the high definition map at a position related to the abnormality and notifying an external server of the abnormality of the high definition map.

According to the present disclosure, there is provided a high definition map abnormality inference and corresponding driving device. The device comprises a memory configured to store at least one instruction; and a processor configured to execute the at least instruction stored in the memory. The processor is configured to: determine an abnormality of a high definition map applied to a mobility apparatus based on at least one of road information or surrounding object information recognized in driving of the mobility apparatus; determine whether exceptional object information recognized on a road is present; determine a road condition to be a temporary change situation which is not accompanied by replacement of the high definition map and determine a first driving control process of the mobility apparatus corresponding to the temporary change situation, when the abnormality of the high definition map and exceptional object information are present; and determine the road condition to be a permanent change situation and determine a second driving control process of the mobility apparatus corresponding to the permanent change situation, when the abnormality of the high definition map is present and the exceptional object information is not present.

According to the present disclosure, there is provided a mobility apparatus. The mobility apparatus comprises a communication unit that transmits and receives signals to and from the outside; an actuator that drives the mobility apparatus; a memory configured to store at least one instruction; and a processor configured to execute the at least instruction stored in the memory and control the actuator. the processor is configured to: determine an abnormality of a high definition map applied to a mobility apparatus based on at least one of road information or surrounding object information recognized in driving of the mobility apparatus; determine whether exceptional object information recognized on a road is present; determine a road condition to be a temporary change situation which is not accompanied by replacement of the high definition map and determine a first driving control process of the mobility apparatus corresponding to the temporary change situation, when the abnormality of the high definition map and exceptional object information are present; and determine the road condition to be a permanent change situation and determine a second driving control process of the mobility apparatus corresponding to the permanent change situation, when the abnormality of the high definition map is present and the exceptional object information is not present.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a diagram illustrating a virtual code for detecting an object recognition vector map abnormality;

DESCRIPTION OF THE PREFERRED EMBODIMENTS

Figure 1:
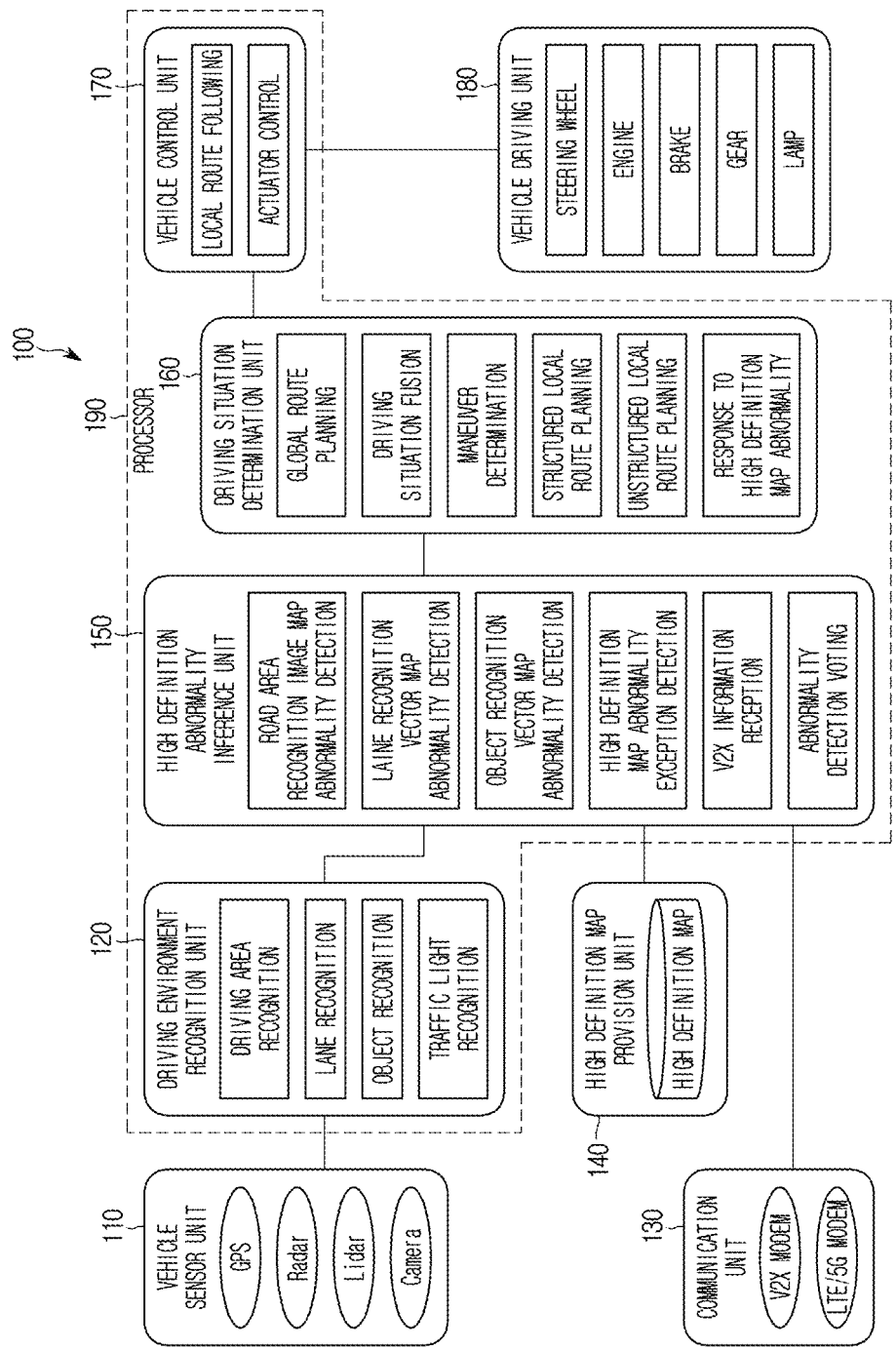
FIG. 1 is a diagram illustrating a configuration of a system implemented in a mobility apparatus according to an embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", ""at Each of the phrases such as "at least one of A, B or C" and "at least one of A, B, C or combination thereof" may include any one or all possible combinations of the items listed together in the corresponding one of the phrases.

Hereinafter, embodiments of the present disclosure will be described with reference to the accompanying drawings.

FIG. 1 is a diagram illustrating a configuration of a system implemented in a mobility apparatus according to an embodiment of the present disclosure.

The mobility apparatus 100 may be, for example, a vehicle capable of autonomous driving, but is not limited thereto and may be a mobility apparatus manually controlled by a driver or an autonomous driving robot. In the present disclosure, it is assumed that the mobility apparatus 100 is an autonomous driving vehicle. In the present disclosure, for convenience of description, terms of a mobility apparatus, an autonomous driving vehicle, and a vehicle will be used interchangeably. The autonomous driving vehicle 100 includes a vehicle sensor unit 110, a driving environment recognition unit 120, a communication unit 130, a high definition map provision unit 140, a high definition map abnormality inference unit 150, a driving situation determination unit 160 and a vehicle driving unit 180. Here, the driving environment recognition unit 120, the high definition map abnormality inference unit 150, the driving situation determination unit 160, and a vehicle control unit 170 may be implemented through a processor 190. The processor 190 may be a single module or may be configured as a multi-module including all modules in charge of each unit. The device including the processor 190 may be a high definition map abnormality inference and corresponding driving device according to the present disclosure. Although not shown in the drawings, the vehicle 100 may include a memory, and the memory may store and manage external and internal data exchanged in the communication unit 130 and the above-described modules of the vehicle 100.

The vehicle sensor unit 110 may include sensors mounted in the vehicle 100 to determine the location of the vehicle 100 and to recognize objects on a surrounding road. Specifically, the vehicle sensor unit 110 may include a GPS for detecting the location of the subject vehicle, and may include sensors such as radar, lidar, and camera in order to obtain the location and velocity of a surrounding obstacle.

The driving environment recognition unit 120 may use the vehicle sensor unit 110 to recognize a drivable area and a lane. Also, the driving environment recognition unit 120 may include a function of recognizing an object related to an obstacle and a traffic light. The drivable area and lane of the road on which the vehicle 100 travels are types of road recognition area and road mark, respectively, and information on the road recognition area and road mark may constitute road information. The obstacle is an object constituting surrounding object information, and may be a dynamic or static object around the driving vehicle 100. The obstacle may be, for example, other vehicles, pedestrians, construction related equipment, and the like.

The communication unit 130 may be controlled to exchange driving state and collection information of the subject vehicle and other vehicles, external information including road conditions and accident information, and high definition map update information. The communication unit 130 may include, for example, a V2X modem for communication with other vehicles and infrastructure (e.g., RSU), and an LTE/5G modem for communication with a server.

The high definition map provision unit 140 may store and provide a high definition map for a road. The high definition map may include spatial information (two-dimensional and three-dimensional information) of surrounding objects and detailed and high-precision road network information of a lane level. The high definition map may include road-related data necessary for a plan of an entire route (or global route) and local route of the vehicle 100.

The high definition map abnormality inference unit 150 may infer an abnormality of the high definition map currently applied to the vehicle 100 based on at least one of road information and surrounding object information provided from the driving environment recognition unit 120. The high definition map abnormality inference unit 150 may perform a plurality of functions corresponding to the high definition map abnormality detection function, that is, image map abnormality detection based on road area recognition of road information, vector map abnormality detection based on lane recognition belonging to road marking information and object recognition vector map abnormality detection based on surrounding object recognition.

In addition, the high definition map abnormality inference unit 150 may implement a function of detecting a high definition map abnormality exception in order to determine whether it is a temporary change situation of a driving road. Detecting the high definition map abnormality exception may include determining whether exceptional object information recognized from the road is present. The exceptional object information may be information related to an object that temporarily changes a road condition due to an accidental situation on the road. The exceptional object information may be, for example, objects related to construction, such as cones and barrels. The high definition map abnormality inference unit 150 may determine whether a change in a front road is a temporary change due to construction or the like, by recognizing construction-related objects.

In addition, the high definition map abnormality inference unit 150 may have a function of receiving external information including V2X information transmitted from infrastructure and other vehicles, that is, accident information and map information. In addition, the high definition map abnormality inference unit 150 may perform a function of detecting a high definition map abnormality exception for determining whether a road is temporarily changed.

The high definition map abnormality inference unit 150 may implement an abnormality detection voting function for finally determining a normality, temporary change, or permanent change of the high definition map based on resultant data based on the above-described function. Temporary change may mean a road condition that is not accompanied by replacement of the high definition map due to presence of exceptional object information, although the high definition map is different from an actual road condition. Permanent change may mean a road condition accompanied by replacement of the high definition map because exceptional object information is not present and the abnormality of the high definition map is present.

As an example, the voting process may be performed using a plurality of pieces of information among information belonging to road information and surrounding object information. The voting process may be performed based on a plurality of results on individual abnormality detection data inferred based on each of the plurality of pieces of information. As another example, the voting process may be performed by using all of road information, surrounding object information, and exceptional object information.

The functions of the high definition map abnormality inference unit 150 will be described in detail later.

The driving situation determination unit 160 may recognize or determine the driving situation of the vehicle 100, based on the recognition result data of the driving environment from the driving environment recognition unit 120, high definition map information of the high definition map provision unit 140, and the abnormality of the high definition map of the high definition map abnormality inference unit 150. The driving situation determination unit 160 determines at least one of the maneuver of the vehicle 100, a plan (or setting) of a local route and corresponding driving according to the abnormality of the high definition map, according to the global route planned (or set) in the vehicle 100, the fusion of the driving situation into the high definition map, and the abnormality of the high definition map. The maneuver, local route setting, corresponding driving, and abnormal notification for replacement of the high definition map constitute a driving control process, and the driving control process may be determined differently depending on whether the high definition map is normal, temporarily changed or permanently changed. The maneuver may be an operation instruction for an actuator that drives the vehicle 100. The maneuver may be, for example, an instruction related to straight ahead, left/right turn, lane change, and stop of the vehicle 100. The local route plan may be divided into a structured local route plan or an unstructured local route plan depending on whether the high definition map is normal. The structured local route may be, for example, a local route set to comply with road lanes and road structures. The unstructured local route may be a local route set based on actual road information and surrounding object information regardless of road information (e.g., road structure, lane, etc.) of the high definition map, upon determining that the high definition map is temporarily changed.

The vehicle control unit 170 may perform local route tracking and actuator control functions according to the result of the driving situation determination unit 160. The actuator control function may be to control the actuator of the vehicle driving unit 180 according to a local route to be followed.

The vehicle driving unit 180 may operate actual actuators such as a steering wheel, an engine, a brake, a gear, and a lamp (e.g., a brake light, a turn indicator light, etc.) according to a control command.

Figure 2:
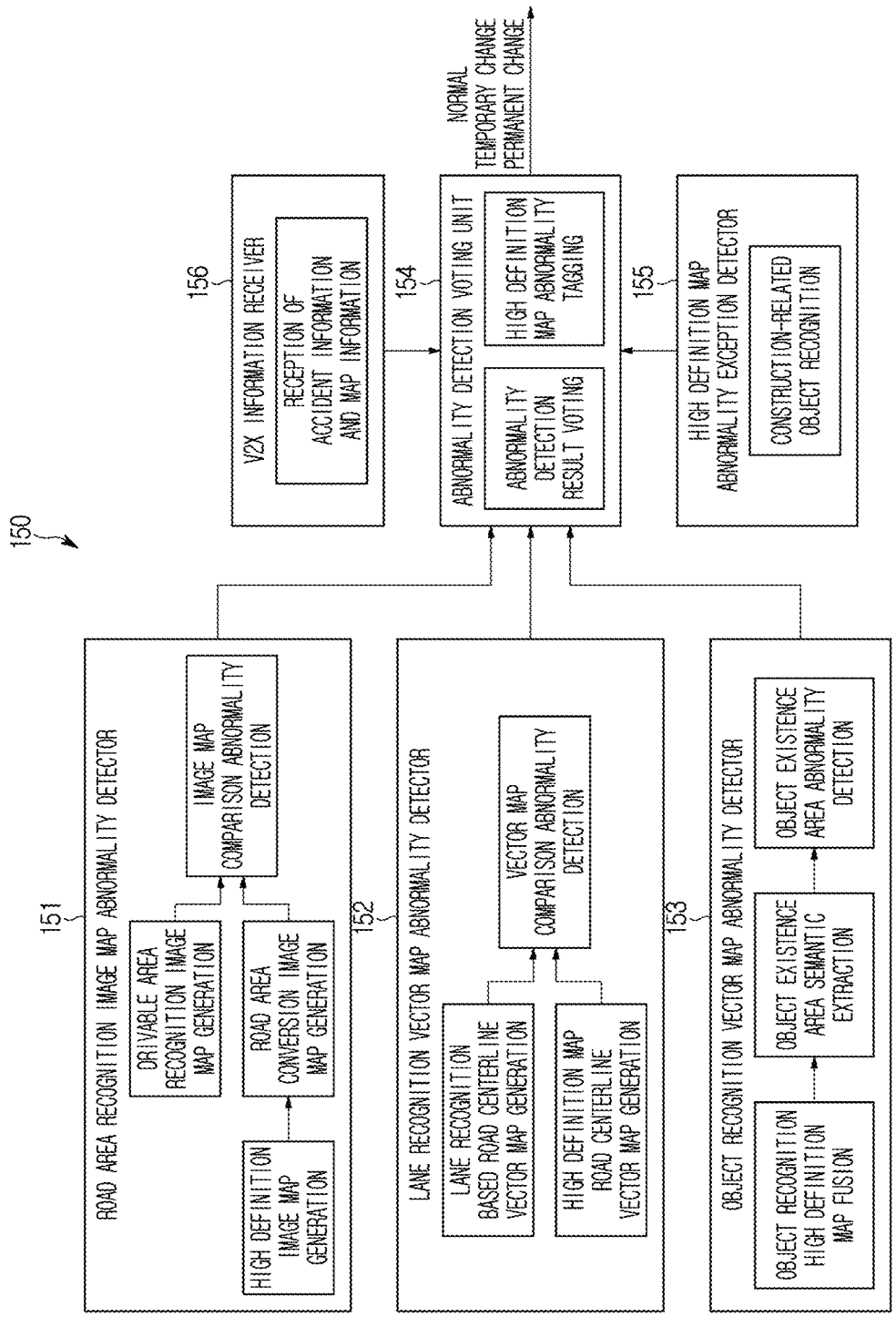
FIG. 2 is a diagram illustrating a configuration of a high definition abnormality inference unit implemented in a high definition abnormality inference and driving device according to another embodiment of the present disclosure.

FIG. 2 is a diagram illustrating a configuration of a high definition abnormality inference unit implemented in a high definition abnormality inference and driving device according to another embodiment of the present disclosure.

The high definition map abnormality inference unit 150 may include a road area recognition image map abnormality detector 151, a lane recognition vector map abnormality detector 152, an object recognition vector map abnormality detector 153, an abnormality detection voting unit 154, a high definition map abnormality exception detector 155 and a V2X information receiver 156.

The road area recognition image map abnormality detector 151 may detect whether a high definition map related to road area recognition is abnormal, based on road area recognition information of the road information detected by the driving environment recognition unit 120. Specifically, the road area recognition image map abnormality detector 151 may compare a drivable area recognition image map recognized by the driving environment recognition unit 120 with an image map derived from the high definition map, and detect whether the high definition map is abnormal. The image map of the high definition map may be an image map converted by copying a specific part from the drivable area recognition image map, among the image maps generated using the high definition map.

Figure 3:
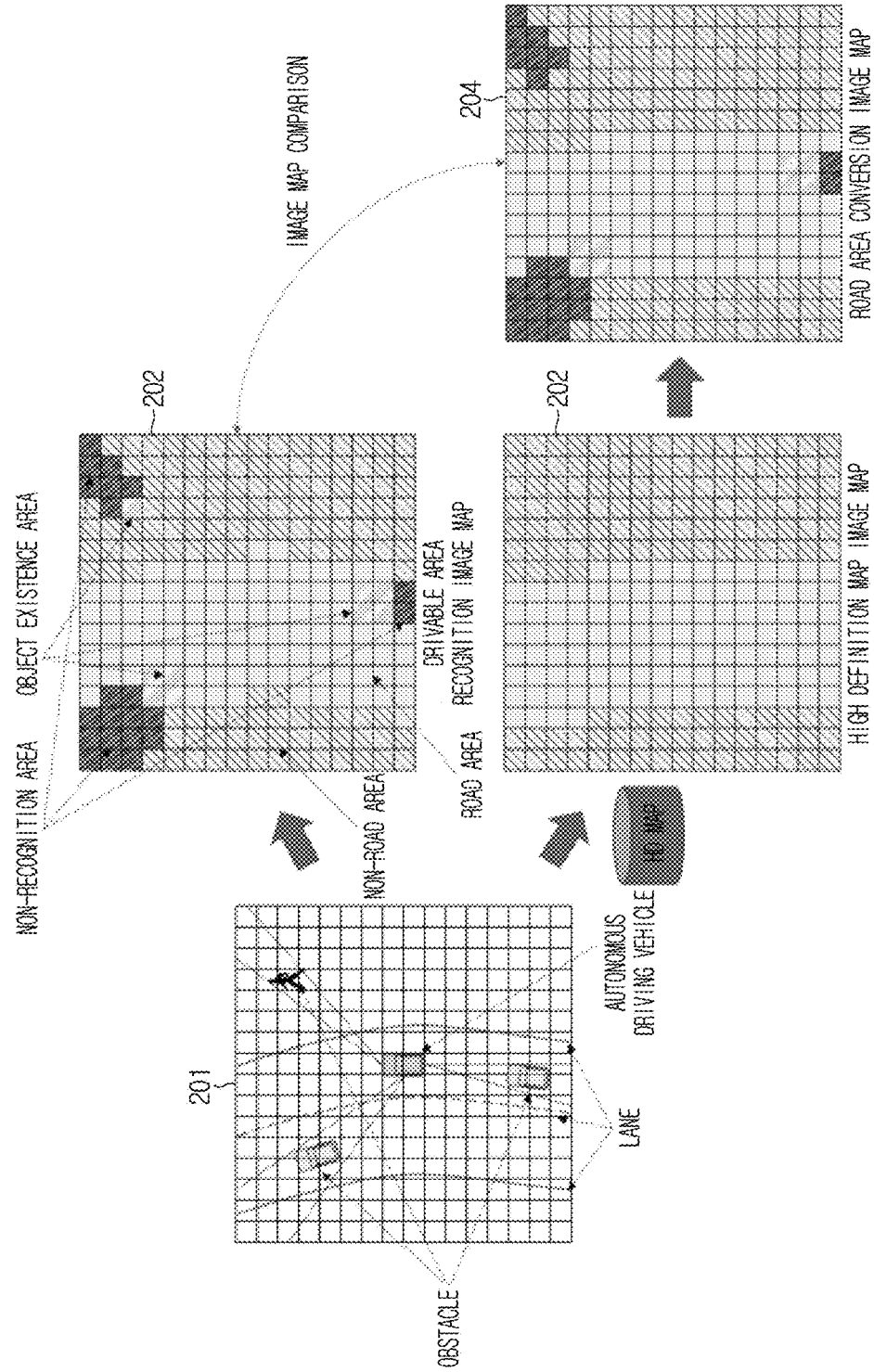
FIG. 3 is a diagram illustrating a high definition map abnormality detection process performed by a road area recognition image map abnormality detector.

FIG. 3 is a diagram illustrating a high definition map abnormality detection process performed by a road area recognition image map abnormality detector.

201 of FIG. 3 shows a high definition map for an actual road, an autonomous driving vehicle, and an obstacle. 202 of FIG. 3 shows a drivable area recognition image map in which a result of recognizing the drivable area of the autonomous driving vehicle in the real road environment is expressed in the form of a grid map. The image map may be generated by a marking process to distinguish a road area, a non-road area, an area where an object exists, and an unrecognized area occluded by an object. 203 of FIG. 3 shows an image map generated using the high definition map.

In the present disclosure, additional processing may be performed to improve comparison performance. Specifically, a road area conversion image map 204 may be generated by copying only an object existence area and a non-recognition area part from the drivable area recognition image map 202 and marking it on the high definition map image map 203. In order to detect whether the high definition map is abnormal, the drivable area recognition image map 202 and the road area conversion image map 204 are adopted as inputs, and whether there is an abnormality in the recognition of the road area of the high definition map may be determined using a classifier that outputs the normality or abnormality of the high definition map. The classifier may be implemented using a machine learning technique or a deep learning technique using a CNN.

The lane recognition vector map abnormality detector 152 may detect whether a high definition map related to the road marking information is abnormal, based on the road marking information of the road information detected by the driving environment recognition unit 120.

Specifically, the lane recognition vector map abnormality detector 152 may generate a vector map by extracting a center line from a lane recognized through a camera or lidar. In addition, the lane recognition vector map abnormality detector 152 may generate a vector map by extracting a road centerline as much as a lane recognition distance from the subject vehicle from the high definition map. In addition, the lane recognition vector map abnormality detector 152 may detect whether the high definition map is abnormal by calculating a sum of the distance difference between the two road centerlines presented in the vector maps.

Figures 4, 5:
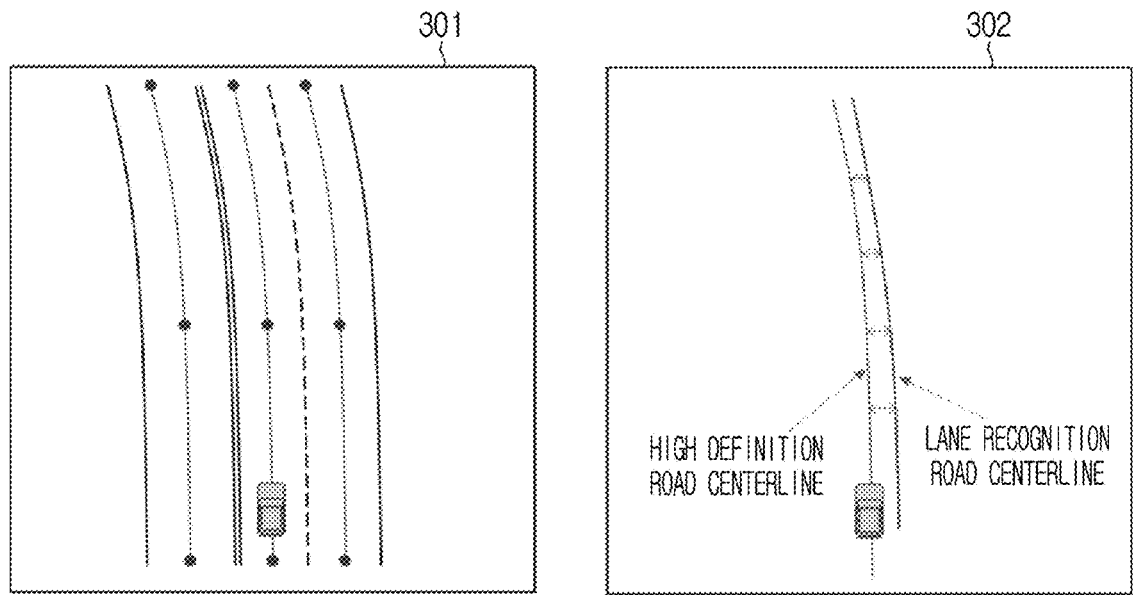
FIG. 4 is a diagram illustrating a high definition map abnormality detection process performed by a lane recognition vector map abnormality detector.
FIG. 5 is a diagram illustrating a virtual code for detecting a lane recognition vector map abnormality.

FIG. 4 is a diagram illustrating a high definition map abnormality detection process performed by a lane recognition vector map abnormality detector.

301 of FIG. 4 illustrates a road centerline of a road network link in a high definition map for a road. 302 of FIG. 4 shows the road centerline of the high definition map and the road centerline generated through lane recognition. As lane recognition vector map abnormality detection, a method of detecting an abnormality when a sum of distances between the road center lien of the high definition map and the lane recognition road centerline is greater than or equal to a specific threshold.

FIG. 5 is a diagram illustrating a virtual code for detecting a lane recognition vector map abnormality.

First, for each point (map_point) in a line-type road centerline (map_centerline) of the high definition map, a distance (distance_pt) from the line-type lane recognition road centerline (perception_line) may be calculated. If the distance is accumulated (distance_sum) to exceed a threshold (threshold_distance_sum) specified by learning or a developer in advance, it may be determined that the high definition map related to road marking information is abnormal, and, if it is equal to or less than the threshold, it may be determined that the high definition map is normal.

The object recognition vector map abnormality detector 153 may superimpose the objects recognized using the driving environment recognition unit 120 on the high definition map, and extract the semantic of the area where the object exists, thereby detecting whether the area where the object exists is abnormal. The semantic may be, for example, a road/non-road area, a lane to which a vehicle belongs, and the like.

Figure 6:
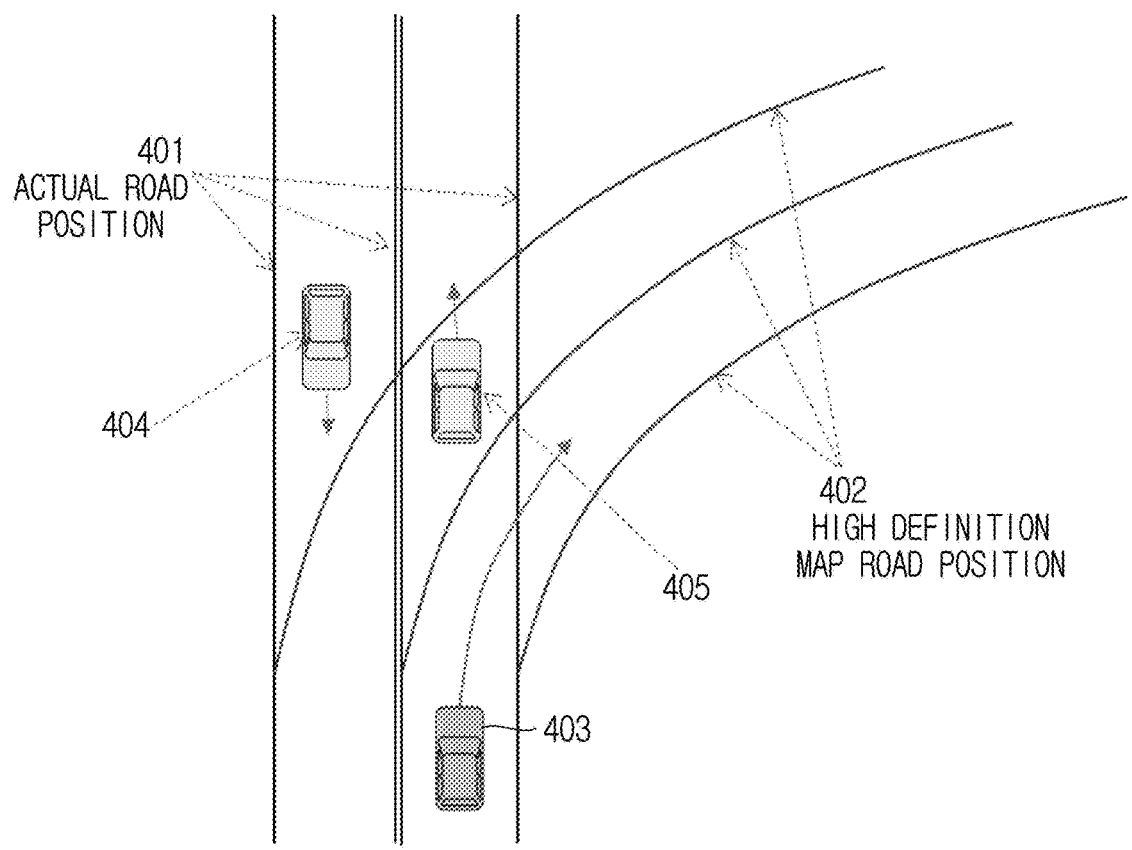
FIG. 6 is a diagram illustrating a high definition map abnormality detection process performed by an object recognition vector map abnormality detector.

FIG. 6 is a diagram illustrating a high definition map abnormality detection process performed by an object recognition vector map abnormality detector.

Here, since a first obstacle vehicle 1 401 is present in the non-road area of the high definition map and has a velocity greater than or equal to a threshold, the object recognition vector map abnormality detector 153 may determine that the high definition map is abnormal. When an obstacle vehicle 2 402 is present on the road but has an angle greater than or equal to the threshold from the heading of the lane, it may be determined that the high definition map is abnormal.

FIG. 7 is a diagram illustrating a virtual code for detecting an object recognition vector map abnormality.

First, for all recognized objects (all_perception_objects), objects (offroad_objects) present in a non-road area may be obtained using the high definition map. If the velocity exceeds a threshold (threshold_velocity) set by learning or developer for each object present in the non-road area, it may be determined that the high definition map is abnormal, and, if it is equal to or less than the threshold, it may be determined that the high precision map is normal. Also, for objects (onroad_objects) present on a road, a heading (object_heading) of each object may be obtained, and a heading (map_heading) of a road to which each object belongs may be obtained from the high definition map. When an absolute value of a difference between the two headings exceeds a threshold threshold_heading, it is determined that the high definition map is abnormal, and, when it is equal to or less than the threshold, it may be determined that the high definition map is normal.

Figure 8:
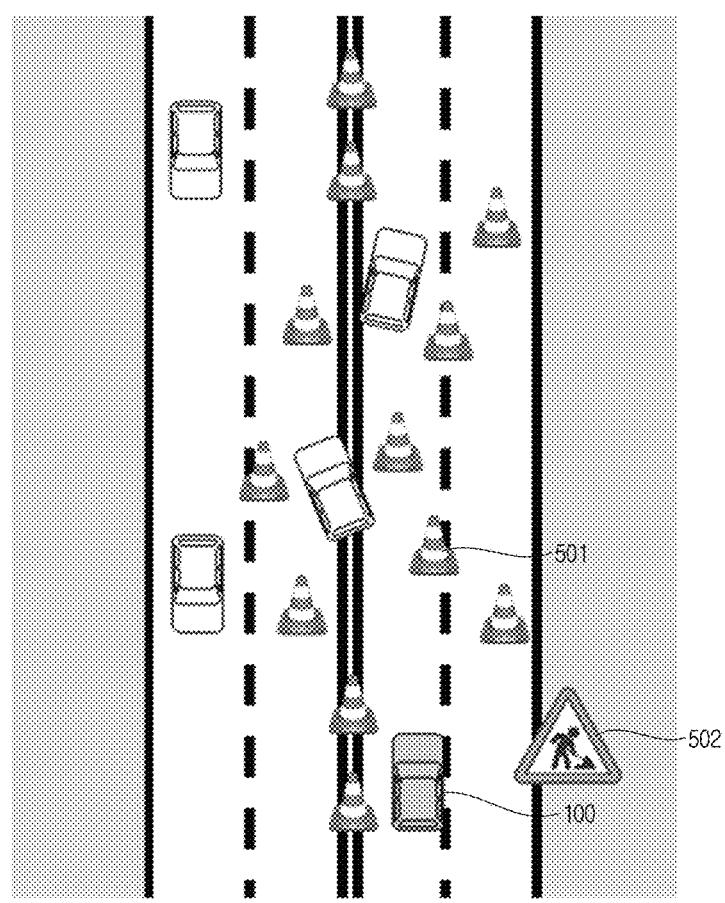
FIG. 8 is a diagram illustrating detected exceptional object information.

As illustrated in FIG. 8, the high definition map abnormality exception detector 155 recognizes construction-related objects such as cones and barrels 501 and 502 as exceptional object information, to determine whether a change in a front road is temporary due to construction. Temporary change may mean an arbitrary change of road conditions. FIG. 8 is a diagram illustrating detected exceptional object information.

The abnormality detection voting unit 154 may collect the results of each of the detectors 151 to 153 and determine normality or permanent change by multiple voting. The abnormality detection voting unit 154 may determine that the road condition is temporarily changed when exceptional object information is detected by the high definition map abnormality exception detector 155. In addition, as the abnormality of the high definition map is determined by abnormality detection result voting and the exceptional object information is not detected, upon determining that when the road condition is permanently changed, the abnormality detection voting unit 154 may tag the abnormality of the high definition map at the position of the high definition map and use it for future driving.

When the V2X information receiver 156 receives external information, the external information may have high priority than road information, surrounding object information, and exceptional object information in determining the abnormality and road condition of the high definition map. Here, the external information may include at least one of traffic situation information or a high definition map which is received from a surrounding mobility apparatus and is more recent than the high definition map. The external information may be, for example, front accident information and updated map information. The road condition may be a temporary change situation or a permanent change situation as described above.

FIG. 6 is a diagram illustrating that high definition map road information provided by an autonomous driving system is different from an actual road. Specifically, FIG. 6 shows that the actual road 401 is changed to be different from the road 402 of the high definition map due to a straightening construction. If the autonomous driving vehicle 403 is driven based on the high definition map in which error has occurred as shown in FIG. 6, an error may occur in autonomous driving determination. The first obstacle vehicle 404 is excluded from a target to be determined because it is outside the road from the road location 402 of the high definition map. Since the second obstacle vehicle 405 is a preceding vehicle on the actual road 401, it is determined to be a vehicle existing in the opposite lane on the road 402 of the high definition map, even though it is a target obstacle used for velocity control. Accordingly, the second obstacle vehicle 405 is excluded from the consideration of autonomous driving determination. If the autonomous driving vehicle 403 follows a route based only on the high definition map, the autonomous driving vehicle may collide with a preceding vehicle due to an erroneous determination, or a dangerous situation in which the autonomous driving vehicle actually travels outside the road may occur.

In the present disclosure, the abnormality of the high definition map may be primarily inferred and detected through the above-described three abnormality detectors 151 to 153 and voting processing. In addition, in consideration of the fact that the abnormality determination by the above-described three abnormality detection methods does not accurately distinguish whether an actual road is generated by a permanent change or a temporary change, an additional configuration may be included.

In case of a permanent change situation, it is necessary to report the abnormality of the high definition map to a server and replace it with a modified high definition map later. However, in the case of a temporary change situation, it is sufficient if only the driving control process of the vehicle 100, i.e., the corresponding driving control, is adjusted. As in FIG. 8, when cones, barrels 501, 502, etc. are temporarily installed for road repair, and the movement state of the vehicle 100 is different from the road of the high definition map, the road abnormality of the high definition map may be determined by the above-described detectors 151 to 153. However, in order to distinguish a temporary change situation with exceptional object information and a permanent change situation as in FIG. 8, in the present disclosure, when construction-related objects are recognized, high definition map abnormality detection that is determined as a temporary road change may be added.

Figure 9:
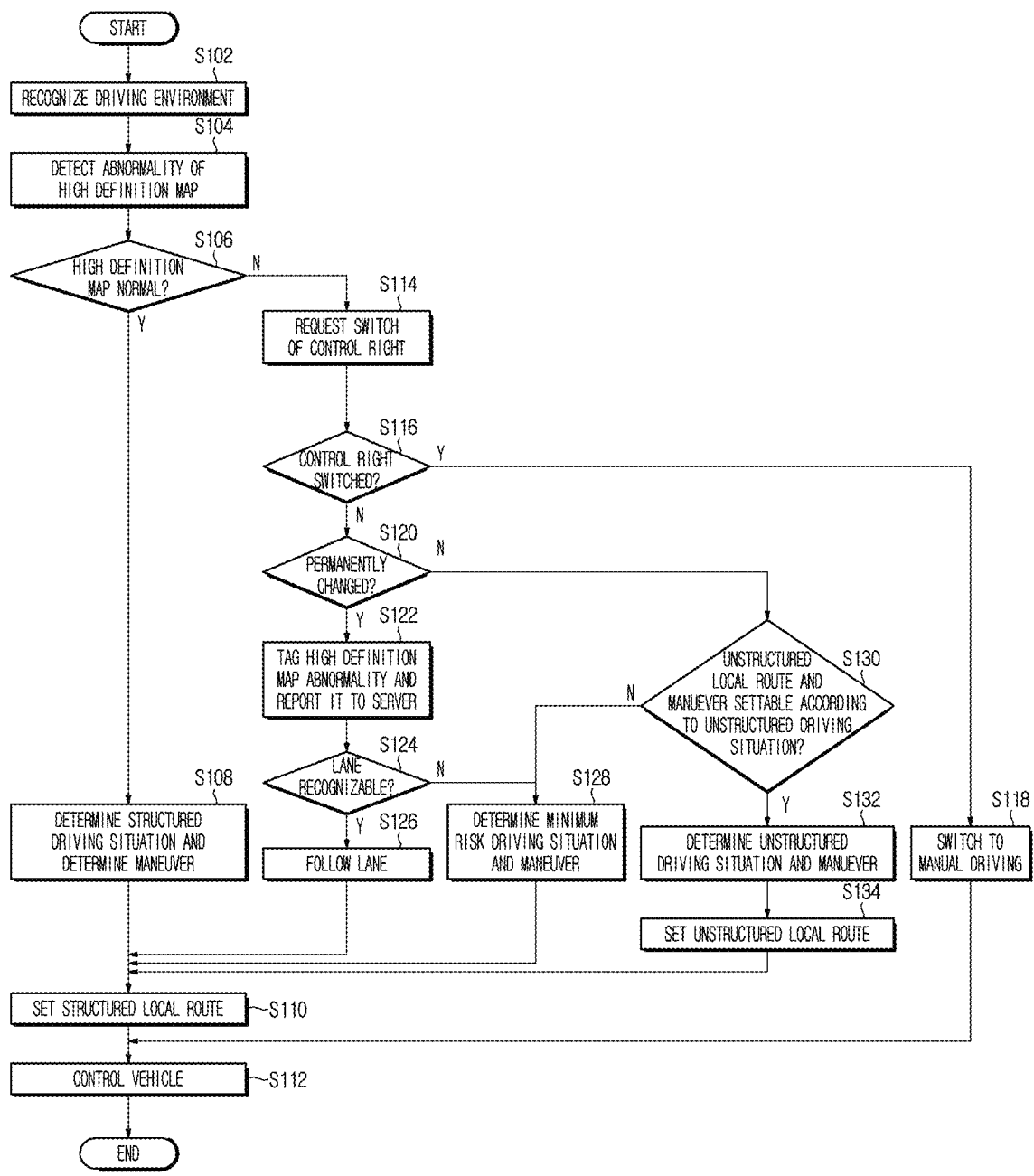
FIG. 9 is a flowchart illustrating a method of inferring abnormality of a high definition map and performing corresponding driving according to another embodiment of the present disclosure.

Referring to FIGS. 1 to 9, a high definition map abnormality inference and corresponding driving method according to another embodiment of the present disclosure will be described in detail. FIG. 9 is a flowchart of a high definition map abnormality inference and corresponding driving method according to another embodiment of the present disclosure.

First, the driving environment recognition unit 120 may use the vehicle sensor unit 110 to obtain driving environment recognition information from the vicinity of the autonomous driving vehicle 100 (S102).

The high definition map abnormality inference unit 150 may detect whether the high definition map is abnormal by using the driving environment recognition information (S104). Each of the detectors 151 to 153 infers individual abnormality detection data based on driving environment recognition information, and the abnormality detection voting unit 154 may determine whether the high definition map is abnormal through multiple voting by the individual abnormality detection data.

If the high definition map is normal (Y in S106), the driving situation determination unit 160 may determine the driving control process of the autonomous driving vehicle 100 by using road information of the current high definition map. The driving control process in the normal state may determine control of the maneuver based on the normal structured driving situation (S108). The driving situation determination unit 160 may control the autonomous driving vehicle 100 by setting a structured local route plan (S110). Here, the structured route plan may mean setting a route to comply with a road lane and a road structure.

As a result of determining whether the high definition map is abnormal, if the high definition map is not normal (N in S106), the driving situation determination unit 160 requests the driver to switch the control right of the autonomous driving vehicle 100 to the driver (S114), and, if the driver accepts it, switch to the manual driving of the autonomous driving vehicle 100 is enabled (S118).

If the switch is not performed within a predetermined time and the autonomous driving of the vehicle 100 is maintained (N in S116), the abnormality detection voting unit 154 may determine whether the actual road condition associated with the high definition map is permanently changed (S120). When the exceptional object information is not detected and it is determined that the high definition map is abnormal as a result of voting, the road condition may be determined to be a permanent change.

If it is a permanent change, the abnormality detection voting unit 154 and/or the driving situation determination unit 160 may tag the abnormality in a high definition map database according to the corresponding driving control process, and notify the server of the abnormality information (S122).

If the lane obtained by the road information is recognized and autonomous driving of the vehicle 100 is possible (Y in S124), the driving situation determination unit 190 determines a driving control process so that the autonomous driving vehicle 100 follows the lane, thereby controlling the driving of the vehicle 100 (S126). When autonomous driving is impossible because a lane is not recognized (N in S124), the driving situation determination unit 160 may determine a predetermined driving control process to control the autonomous driving vehicle 100. For example, the driving situation determination unit 160 may perform the determination of the maneuver while determining a minimum risk driving situation (S128). Accordingly, the autonomous driving vehicle 100 may be controlled to a minimum risk level to stop at a slow velocity in a road area while preventing collision with a preceding vehicle.

If the high definition map abnormality inference result corresponds to a temporary change according to the exceptional object information (N in S120), the driving situation determination unit 160 may determine whether the unstructured local route and operation control (maneuver control) of the vehicle 100 are settable, based on the driving situation information, that is, the unstructured driving situation (S130). The unstructured area route may be, for example, a route set such that vehicles travel regardless of the road structure due to construction or the like.

If the unstructured local route and operation control of the vehicle 100 are settable, the driving situation determination unit 160 may check the unstructured driving situation and determine a corresponding driving control process. Specifically, the driving situation determination unit 160 may determine a maneuver according to the driving situation (S132) and set an unstructured local route plan (S134), and the autonomous driving of the vehicle 100 may be controlled according to the driving control process including the set maneuver and the route plan.

If the unstructured local route and maneuver setting are impossible, the driving situation determination unit 160 may determine the minimum risk driving situation and determine the driving control process for performing a maneuver determination (S128). Accordingly, the autonomous driving vehicle 100 may be controlled to a minimum risk level to stop at a slow velocity in a road area while preventing collision with a preceding vehicle.

On the other hand, when the abnormality detection voting unit 154 receives external information adopted as highest priority information, the abnormality detection voting unit 154 may determine whether the high definition map is abnormal and the road condition based on the external information. The driving situation determination unit 160 may control the autonomous driving vehicle 100 by determining a driving control process according to the determination of the abnormality detection voting unit 154.

According to the present disclosure, in order to reduce the risk according to the abnormality of the high definition map in autonomous driving based on the high definition map, a high definition map abnormality inference process may be added before an autonomous driving determination. Specifically, the reliability of abnormality detection can be improved by determining whether the high definition map is abnormal by fusion of road drivable area recognition, lane recognition, object (vehicle, pedestrian, construction-related object, etc.) and information transmitted to V2X. That is, by improving the accuracy of inference, it does not unnecessarily tag or report errors of the high definition map to the server, and the corresponding driving according to the abnormality of the high definition map can be appropriately determined.

In addition, if abnormality is inferred, the control right of the autonomous driving vehicle 100 may be switched to the driver, or a corresponding driving with minimal risk may be executed by determining the driving situation according to the degree of road change and determining the maneuver.

According to an embodiment of the present disclosure, it is possible to provide a high definition map abnormality inference and corresponding driving method, device and mobility apparatus, which infer an abnormality of a high definition map when the high definition map installed in the mobility apparatus capable of autonomous driving is different from an actual road or has errors and determine control processing of the mobility apparatus according to a result of inference.

It will be appreciated by persons skilled in the art that that the effects that can be achieved through the present disclosure are not limited to what has been particularly described hereinabove and other advantages of the present disclosure will be more clearly understood from the detailed description.

Effects obtained in the present disclosure are not limited to the above-mentioned effects, and other effects not mentioned above may be clearly understood by those skilled in the art from the following description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A high definition map abnormality inference and corresponding driving method comprising: determining an abnormality of a high definition map applied to a mobility apparatus based on at least one of road information or surrounding object information recognized in driving of the mobility apparatus; determining whether exceptional object information recognized on a road is present, wherein the exceptional object information comprises information related to an object for temporarily changing the road condition; determining a road condition to be a temporary change situation which is not accompanied by replacement of the high definition map and determining a first driving control process of the mobility apparatus corresponding to the temporary change situation, when the abnormality of the high definition map and the exceptional object information are present; determining the road condition to be a permanent change situation and determining a second driving control process of the mobility apparatus corresponding to the permanent change situation, when the abnormality of the high definition map is present and the exceptional object information is not present, and controlling the mobility apparatus to operate a steering wheel, an engine, a brake and a gear of the mobility apparatus according to the determined the first driving control process or the second driving control process; wherein, when autonomous driving of the mobility apparatus is maintained, the determining of the first driving control process comprises: checking driving situation information of the mobility apparatus based on the exceptional object information in the road condition; and determining whether an unstructured local route and operation control of the mobility apparatus are settable based on the driving situation information; wherein controlling the mobility apparatus according to the determined first driving control process comprises: in response to the unstructured local route and operation control being settable, performing control such that the mobility apparatus is autonomously driven according to the unstructured local route and operation control: and in response to the unstructured local route and operation control being not settable, controlling the mobility apparatus to a minimum risk level to stop at a slow velocity, wherein the determining of the second driving control process comprises, determining whether a lane obtained by the road information is recognizable, wherein controlling the mobility apparatus according to the determined second driving control process comprises: in response to the lane being recognized controlling the mobility apparatus to follow the lane: and in response to the lane being not recognized, controlling the mobility apparatus to the minimum risk level to stop at a slow velocity, and wherein the unstructured local route is a local route set based on actual road information and surrounding object information regardless of road information of the high definition map.

2. The high definition map abnormality inference and corresponding driving method of claim 1, wherein, when the abnormality of the high definition map is determined by a plurality of pieces of information among information belonging to the road information and the surrounding object information, the abnormality of the high definition map is determined through a voting process using individual abnormality detection data inferred based on each of the plurality of pieces of information.

3. The high definition map abnormality inference and corresponding driving method of claim 1, wherein the road information comprises at least one of a road recognition area recognized in driving of the mobility apparatus or road marking information.

4. The high definition map abnormality inference and corresponding driving method of claim 1, wherein the surrounding object information comprises state information of an object around the driving mobility apparatus.

5. The high definition map abnormality inference and corresponding driving method of claim 1, further comprising determining the road condition based on external information when the external information, having higher priority than the road information, the surrounding object information and the exceptional object information, is received,
wherein the external information comprises at least one of traffic situation information or a high definition map which is received from a surrounding mobility apparatus and is more recent than the high definition map.

6. The high definition map abnormality inference and corresponding driving method of claim 1, wherein the second driving control process comprises tagging the abnormality of the high definition map at a position related to the abnormality and notifying an external server of the abnormality of the high definition map.

7. A high definition map abnormality inference and corresponding driving device comprising: a memory configured to store at least one instruction; and a processor configured to execute the at least instruction stored in the memory, wherein the processor is configured to: determine an abnormality of a high definition map applied to a mobility apparatus based on at least one of road information or surrounding object information recognized in driving of the mobility apparatus; determine whether exceptional object information recognized on a road is present, wherein the exceptional object information comprises information related to an object for temporarily changing the road condition; determine a road condition to be a temporary change situation which is not accompanied by replacement of the high definition map and determine a first driving control process of the mobility apparatus corresponding to the temporary change situation, when the abnormality of the high definition map and the exceptional object information are present; determine the road condition to be a permanent change situation and determine a second driving control process of the mobility apparatus corresponding to the permanent change situation, when the abnormality of the high definition map is present and the exceptional object information is not present, and control the mobility apparatus to operate a steering wheel, an engine, a brake and a gear of the mobility apparatus according to the determined first driving control process or the second driving control process; wherein, when autonomous driving of the mobility apparatus is maintained, the determining of the first driving control process comprises: checking driving situation information of the mobility apparatus based on the exceptional object information in the road condition; and determining whether an unstructured local route and operation control of the mobility apparatus are settable based on the driving situation information; wherein controlling the mobility apparatus according to the determined the first driving control process comprises: in response to the unstructured local route and operation control being settable, performing control such that the mobility apparatus is autonomously driven according to the unstructured local route and operation control, and in response to the unstructured local route and operation control being not settable, controlling the mobility apparatus to a minimum risk level to stop at a slow velocity, wherein the determining of the second driving control process comprises, determining whether a lane obtained by the road information is recognizable, wherein controlling the mobility apparatus according to the determined second driving control process comprises: in response to the lane being recognized controlling the mobility apparatus to follow the lane; and in response to the lane being not recognized, controlling the mobility apparatus to the minimum risk level to stop at a slow velocity, and wherein the unstructured local route is a local route set based on actual road information and surrounding object information regardless of road information of the high definition map.

8. The high definition map abnormality inference and corresponding driving device of claim 7, wherein, when the abnormality of the high definition map is determined by a plurality of pieces of information among information belonging to the road information and the surrounding object information, the abnormality of the high definition map is determined through a voting process using individual abnormality detection data inferred based on each of the plurality of pieces of information.

9. The high definition map abnormality inference and corresponding driving device of claim 7, wherein the road information comprises at least one of a road recognition area recognized in driving of the mobility apparatus or road marking information.

10. The high definition map abnormality inference and corresponding driving device of claim 7, wherein the surrounding object information comprises state information of an object around the driving mobility apparatus.

11. The high definition map abnormality inference and corresponding driving device of claim 7, wherein the processor is further configured to determine the road condition based on external information when the external information, having higher priority than the road information, the surrounding object information and the exceptional object information, is received,
wherein the external information comprises at least one of traffic situation information or a high definition map which is received from a surrounding mobility apparatus and is more recent than the high definition map.

12. The high definition map abnormality inference and corresponding driving device of claim 7, wherein the second driving control process is further configured to tag the abnormality of the high definition map at a position related to the abnormality and to notify an external server of the abnormality of the high definition map.

13. A mobility apparatus comprising: a communication unit that transmits and receives signals to and from the outside; an actuator that drives the mobility apparatus; a memory configured to store at least one instruction; and a processor configured to execute the at least instruction stored in the memory and control the actuator, wherein the processor is configured to: determine an abnormality of a high definition map applied to a mobility apparatus based on at least one of road information or surrounding object information recognized in driving of the mobility apparatus; determine whether exceptional object information recognized on a road is present, wherein the exceptional object information comprises information related to an object for temporarily changing the road condition; determine a road condition to be a temporary change situation which is not accompanied by replacement of the high definition map and determine a first driving control process of the mobility apparatus corresponding to the temporary change situation, when the abnormality of the high definition map and exceptional object information are present; determine the road condition to be a permanent change situation and determine a second driving control process of the mobility apparatus corresponding to the permanent change situation, when the abnormality of the high definition map is present and the exceptional object information is not present; and control the mobility apparatus to operate a steering wheel, an engine, a brake and a gear of the mobility apparatus according to the determined first driving control process or the second driving control process; wherein, when autonomous driving of the mobility apparatus is maintained, the determining of the first driving control process comprises: checking driving situation information of the mobility apparatus based on the exceptional object information in the road condition; and determining whether an unstructured local route and operation control of the mobility apparatus are settable based on the driving situation information; wherein controlling the mobility apparatus according to the determined first driving control process comprises: in response to the unstructured local route and operation control being settable, performing control such that the mobility apparatus is autonomously driven according to the unstructured local route and operation control, and in response to the unstructured local route and operation control being not settable, controlling the mobility apparatus to a minimum risk level to stop at a slow velocity, wherein the determining of the second driving control process comprises, determining whether a lane obtained by the road information is recognizable, wherein controlling the mobility apparatus according to the determined second driving control process comprises: in response to the lane being recognized controlling the mobility apparatus to follow the lane; and in response to the lane being not recognized, controlling the mobility apparatus to the minimum risk level to stop at a slow velocity, and wherein the unstructured local route is a local route set based on actual road information and surrounding object information regardless of road information of the high definition map.

* * * * *